Nov. 30, 1965 M. WALTERS Re. 25,922

DISPLAY DEVICE FOR SHOES

Original Filed Aug. 6, 1962

INVENTOR.
MAX WALTERS
BY Roy Griffith Jones
ATTORNEY

United States Patent Office

Re. 25,922
Reissued Nov. 30, 1965

25,922

DISPLAY DEVICE FOR SHOES

Max Walters, 881 Randolph Place, Union, N.J.

Original No. 3,076,984, dated Feb. 12, 1963, Ser. No. 214,906, Aug. 6, 1962. Application for reissue Jan. 28, 1965, Ser. No. 448,902
2 Claims. (Cl. 12—1)

Matter enclosed in heavy brackets [ ] appears in the original patent but forms no part of this reissue specification; matter printed in italics indicates the additions made by reissue.

This invention relates to a device used in exhibiting or displaying, as in show windows, certain classes of shoes, especially women's open shoes of the type called sandals, or the like, which have a holding strap adapted to go around the wearer's heel.

In exhibiting sandals, etc., of the type mentioned, the heel strap, being comparatively long and narrow, is not self-supporting, and consequently drops onto the heel of the sandal and presents an inartistic appearance. To avoid such an appearance, I have devised a support or stay for holding the strap in its normal wearing position, thereby giving the shoe a more attractive display appearance.

The drawings illustrate the invention, and in these:

Figure 1:
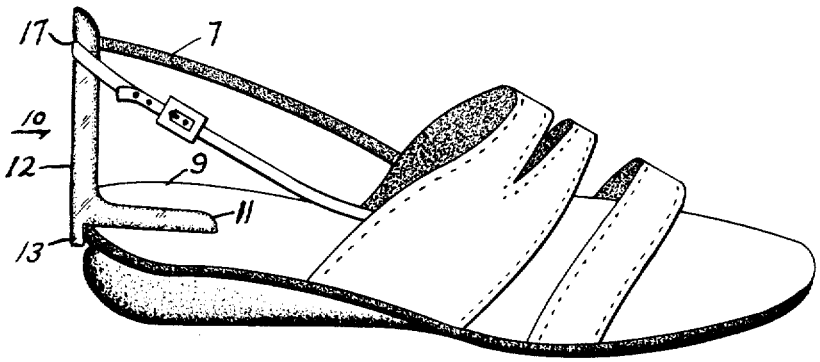
FIGURE 1 is a perspective view of a sandal in which the heel strap is held up by the supporting device or stay.

Referring to the drawings for a detailed description, the sandal of FIGURE 1 comprises a looped heel strap 7 which, when on display without a support, lies on top of the heel portion 9 of the sandal. To hold the strap in elevated position and in the position it assumes when the sandal is worn, I provide an L-shaped support 10, which comprises a horizontal part 11, a vertical part 12, and a projection 13 depending from the vertical part 12. The horizontal part rests on the heel portion of the shoe, and said depending projection carries a small pin or tack 15 which is pressed into the back of the heel portion to hold the support to the sandal. The upper part of the vertical part 12 has a notch 17 formed therein near its upper end and at the back thereof, and receives the looped portion of the strap.

Figure 2:
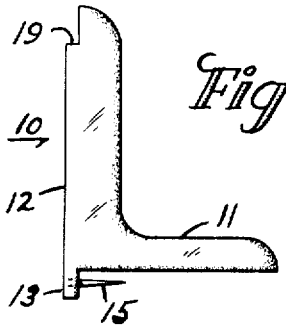
FIGURES 2 and 3 are side views of two modified forms of support.
Figure 4:
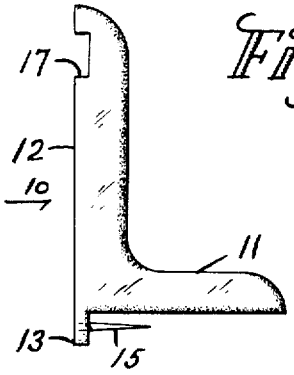
FIGURE 4 is a side view of the support shown in FIGURE 1.

FIGURE 2 shows a modified form of support which is similar in form of that of FIGURES 1 and 4, but the strap-holding notch 19 in FIGURE 2 is formed at the back of the upper terminal portion of the vertical part.

Figure 3:
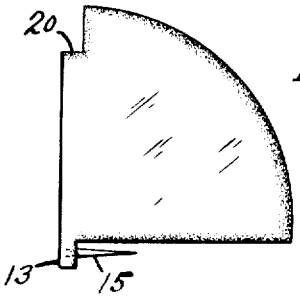

FIGURE 3 shows another modification, which is mainly in the form of a quadrant, and has a notch 20 cut or molded in a position similar to notch 19 of FIGURE 2, and also has a depending projection and pin as shown in FIGURES 1, 2, and 4.

Because the surface of the heel part of the sandal inclines downwardly in a forward direction, the angle between the horizontal and vertical parts of the support shown in FIGURES 1, 2, and 4, and the back angle of FIGURE 3, may be made a little more than 90°.

What is claimed is:

1. A display device for use with a shoe having a heel portion and a single adjustable heel strap, said strap anchored at its front ends to the sides of the shoe and extending backwardly free to go around the heel of the wearer and requiring support for display purposes to hold it in normal wearing position, said device comprising an upright member adapted to support adjacent its top the rear of the heel strap, said device having a base portion adapted to be placed on the top surface of the heel portion and extending forwardly from the rear of the heel portion along the longitudinal medial line of the shoe, and a projecting portion extending downwardly in the plane of the body of the device below the top surface of the heel portion and adapted to contact the back of the heel portion, and [a pin] *means* carried by said projecting portion and adapted to [be secured in] *engage* the back of the heel portion to [anchor] *hold* the display device to the shoe.

2. The combination specified in claim 1, in which the display device is generally L-shaped and in which the heel strap is adapted to rest in a notch formed in the device adjacent the top of the latter.

References Cited by the Examiner

The following references, cited by the Examiner, are of record in the patented file of this patent or the original patent.

UNITED STATES PATENTS

| | | | |
|---|---|---|---|
| 2,193,943 | 3/1940 | Shea | 36—11.5 |
| 2,936,533 | 5/1960 | Paynor | 36—11.5 X |
| 2,976,623 | 3/1961 | Gallaway | 36—11.5 |

JORDAN FRANKLIN, *Primary Examiner.*